United States Patent [19]

Melcher

[11] 3,947,175
[45] Mar. 30, 1976

[54] APPARATUS FOR INJECTION MOLDING OF BODIES WITH A CORE AND SKIN OF DIFFERENT MATERIALS

[75] Inventor: Robert Albert Melcher, Wenden, Germany

[73] Assignee: Siemag Siegener Maschinenbau GmbH, Hilchenbach-Dahlbruch, Germany

[22] Filed: Dec. 7, 1973

[21] Appl. No.: 422,965

[30] Foreign Application Priority Data
Dec. 7, 1972 Germany............................ 2259818
Aug. 24, 1973 Germany............................ 2342789

[52] U.S. Cl.............. 425/130; 425/245 R; 425/248; 425/817 R; 425/DIG. 224; 222/144.5; 222/525
[51] Int. Cl.²............................................ B29F 1/10
[58] Field of Search.......... 425/130, 132, 133, 245, 425/247, 817 R, 4, 248, DIG. 224, DIG. 225, 166, 145, 147; 222/144.5, 525

[56] References Cited
UNITED STATES PATENTS

| | | | |
|---|---|---|---|
| 3,070,126 | 12/1962 | Schneider................. | 425/DIG. 224 |
| 3,436,793 | 4/1969 | Trueblood.......................... | 425/159 |
| 3,488,810 | 1/1970 | Gellert................................ | 425/245 |
| 3,541,946 | 11/1970 | Johnston........................ | 425/133.1 |
| 3,599,290 | 8/1971 | Garner............................. | 425/245 X |
| 3,733,156 | 3/1973 | Garner............................. | 425/245 X |
| 3,778,209 | 12/1973 | Wallace et al..................... | 425/132 |
| 3,793,415 | 2/1974 | Smith........................ | 425/817 R X |
| 3,894,823 | 7/1975 | Hanning............................. | 425/130 |

FOREIGN PATENTS OR APPLICATIONS

| | | | |
|---|---|---|---|
| 1,290,262 | 1962 | France................... | 425/130 |

*Primary Examiner*—J. Howard Flint, Jr.
*Assistant Examiner*—Carl Rowold
*Attorney, Agent, or Firm*—Norman S. Blodgett; Gerry A. Blodgett

[57] ABSTRACT

Injection molding apparatus for discontinuous fabrication of molded bodies consisting of a plurality of layers with a foaming core and an outer skin of non-foaming thermoplastic material, the apparatus consisting of an injection head connected to two extruders and equipped with a centrally-located jet surrounded by a ring jet.

6 Claims, 5 Drawing Figures

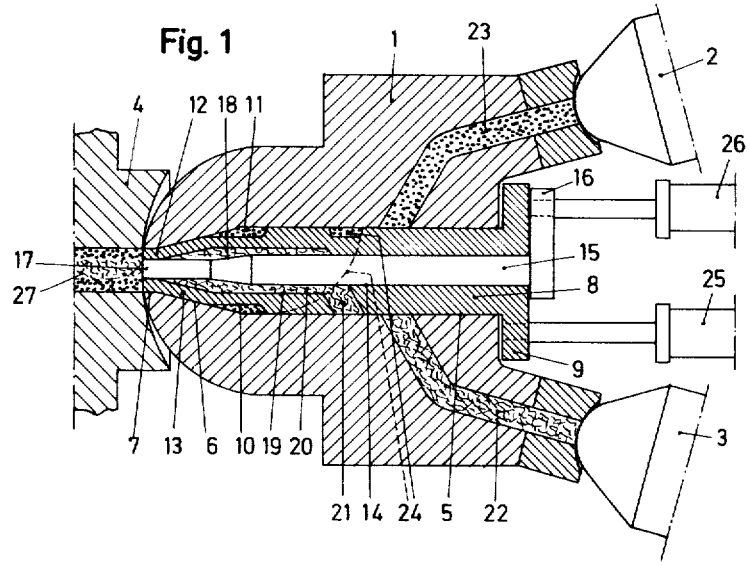
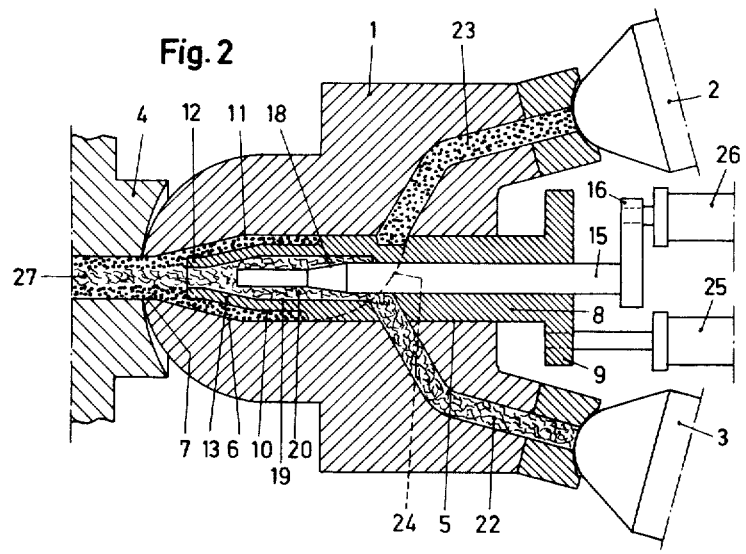

APPARATUS FOR INJECTION MOLDING OF BODIES WITH A CORE AND SKIN OF DIFFERENT MATERIALS

BACKGROUND OF THE INVENTION

Molded bodies, made from foam plastics have an advantage over molded bodies made from dense plastic, because they can be fabricated on the one hand independently of wall thickness and on the other hand they have considerably lower weight. This results in a considerable saving of material without a sacrifice in the strength of the molded body. The disadvantage of molded bodies made from plastic which contains a blowing agent is that it produces a rough surface. If this rough surface is not desirable, only an additional working step can make the molded body of the required smoothness. To later improve the surface of a molded body made from foamed plastic, a number of procedures are known, all of which require a high expenditure which usually cannot be justified. German Pat. No. 1,778,457 describes a procedure for fabrication of plural-layer molded bodies with a foamed core and a non-foaming thermoplastic outer skin; first a plug is pushed into the mold and filled with an uncompleted charge of non-foaming thermoplastic material; thereafter, before solidification of the inside of this plug to the first charge, a second charge is injected which contains a blowing agent where the material of the second charge presses the material of the first charge to all sides into the mold so that it is completely filled. Devices for the execution of this procedure are described in the German Pat. No. 1,779,280, the German Pat. No. 1,814,343, and the German Pat. No. 2,007,238; the second charge is introduced only when the introduction of the first charge has been interrupted or completely ended. However, this procedure often leads to undesirable markings on the surfaces of the finished molded bodies. Furthermore, it is possible, especially on molded bodies with complicated molds, that the first injected charge is not pressed uniformly against the walls of the mold by the following foaming charge, but is rather driven so far apart that it tears. In this case, the smooth surface of the outer skin is interrupted and the molded body is not usable. To prevent this from happening, the amount of the non-foaming thermoplastic materials is often increased by a certain amount which amount is not necessary for the fabrication of a molded part with a non-foaming thermoplastic outer skin. This naturally leads again to an additional weight increase.

Another procedure has been suggested (which does not belong to this art), especially for injection molding of plastic parts with thick walls and smooth surface and porous core; wherein, first, the material forming the smooth surface and, thereafter, the inner plastic is injected into the mold which contains the blowing agent. First, a part of the material which forms the smooth surface is injected and, thereafter, the plastic containing the blowing agent with more material forming the smooth surface is injected at the same time. The device for execution of this procedure contains an injection head which is connected with two injection cylinders. Within the injection cylinder, which takes in the material forming the smooth surface, is arranged a piston-cylinder operating as an injection piston which takes in the material containing the blowing agent. This piston and cylinder carries on its front end a displacement jet and its rear end is equipped with channels; it is capable of being pushed into the inside of the piston-cylinder carrying the material containing the blowing agent. Furthermore, the injection jet is equipped with a gate-valve movable transversely of the flow channel. By this design there is the condition that the outlet nozzle arranged on the mold body extends relatively far into the closed injection jet, so that the mold ejection procedure is greatly handicapped. In addition, this device is complicated and expensive, because of the shape of the injection jet. After the hardening of the molded body, the outlet nozzle has to be removed by cutting or breaking off, which requires an additional working procedure which should not be overlooked.

In the German Pat. No. 1,154,264 a device is described for a continuous extrusion press for endless mold bodies or of plate-shaped elements containing a foamed material core and an outside skin made from thermoplastic material, in which the jet is arranged centrally inside the injection head of the extrusion press for the exit of the foam plastic and is surrounded by a jet for the exit of the foam plastic material, from which the thermoplastic material exits along with the foamed plastic. Based on the working procedure of this device, these mold bodies of plate-shaped design elements have front faces which are not provided with a layer of thermoplastic material; this means that formed bodies or plate-shaped design elements may not be fabricated where its foam material core is completely surrounded by a cover of dense thermoplastic material.

The present invention provides apparatus for the discontinuous fabrication of mold bodies made with several layers of thermoplastic material, which has a simple design by which the different materials can be injected separately or in common. Furthermore, by means of this device, it is possible for the thickness of the individual layers of the finished mold bodies to be changeable. To solve this task, according to this invention, it is suggested that the ring jet be limited in its movement through the injection head and that an axially-displaceable ring jet guided within the injection head be provided in the form of a closing sleeve whose bore forms the central jet equipped with a displaceable closure needle.

According to a further characteristic of this invention, the front faces of the sleeve and the closure needle are closed in their injection position in the plane of the front face of the injection head. By this method, it is assured that, in the area of the injection head, no outlet nozzle is created, so that the molded bodies may be removed without any difficulty by opening the mold.

The front face of the sleeve, closure needle, and injection head can form a part of the inside wall of the mold. This design would be used in the case where no outlet nozzle on the molded body should be created. Therefore, the expenditure of work to remove the outlet nozzle is eliminated. In addition, a molded body made by this device contains a covering made from dense thermoplastic material which completely surrounds the foam material core. Connected to the sleeve and the closure needle are separate or common displacement drives, where the use of a common displacement drive can bring the sleeve against the force of a spring through the closure needle into its arrested position. According to a further characteristic of this invention, the displacement drives are controllable for the sleeve and the closure needle in accordance with the position of the piston within the injection cylinders, so that the opening and closing of the central jet and the ring jet may be selectively chosen.

SUMMARY OF THE INVENTION

In general, the invention consists of an injection molding apparatus having an injection head with two injection cylinders and having a central jet with a ring jet surrounding it. The ring jet is guided and limited by the injection head. Axially displaceable in the head is a ring jet closing sleeve whose bore forms the central jet and which is equipped with a displaceable closure needle.

More specifically, the sleeve and the closure needle have front faces which are in their stopped position coplanar with the front face of the head.

BRIEF DESCRIPTION OF THE DRAWINGS

The character of the invention, however, may be best understood by reference to one of its structural forms, as illustrated by the accompanying drawings, in which:

FIG. 1 shows an injection molding apparatus in crossection with a closed central jet and closed ring jet, FIG. 2 shows a presentation of FIG. 1 with an open central jet and an open ring jet.

DESCRIPTION OF THE PREFERRED EMBODIMENT

Figure 3:
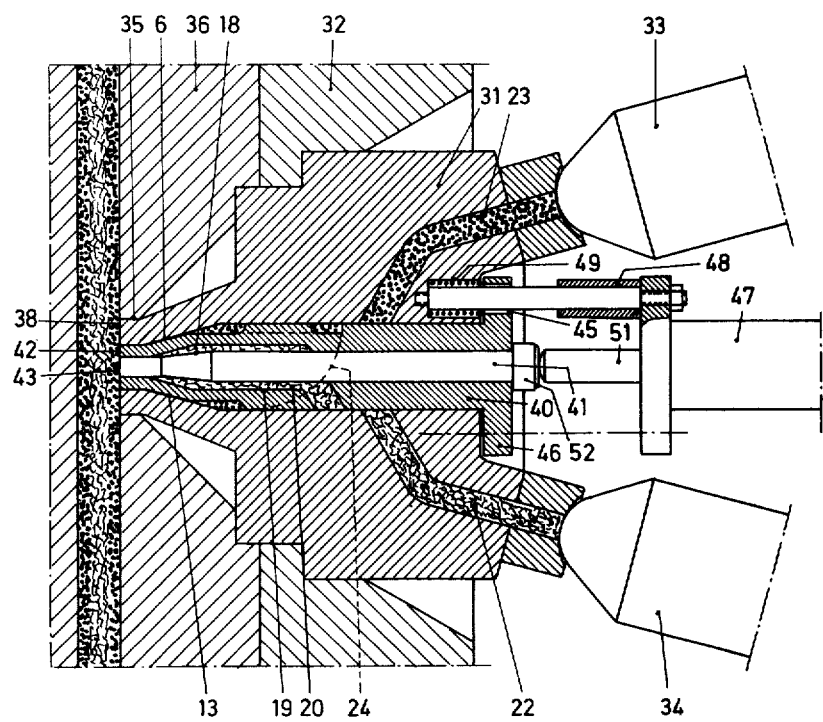
FIG. 3 shows a modified form of the injection molding apparatus with closed central jet and closed ring jet.

FIGS. 1 and 2 of the drawing show an injection head 1 of an injection molding apparatus for the discontinuous fabrication of molded bodies made with several layers with a foamed core and a non-foamed thermoplastic outer skin. Only two jet cylinders 2, 3 of the known type are shown as attached, these being connected to extruders in the well-known manner. In the described example, the injection head 1 is positioned against an outlet sleeve 4 of a conventional injection mold, not shown, which contains a mold cavity for forming a configured body with several layers. The injection head 1 is equipped with a centrally-located bore 5, which has through most of its length a constant cylindrical shape and close to the outlet nozzle 4 is formed with a conical surface 6. To the conical surface 6 is attached another short cylindrical part 7. In this bore 5 is positioned a sleeve 8 which is displaceable in the axial direction and which has a short arm 9 arranged on the end extending out of the injection head 1. The short arm and the short cylindrical part 7 form a ring nozzle between them. Close to the end facing the outlet jet 4, the sleeve 8 is equipped with a reset 10 having a smaller diameter, so that a space 11 is formed between the wall of bore 5 and the reset 10 surrounding it circumferentially. The end of the sleeve 8 opposite the end having the arm 9 has the shape of a hollow cylinder 12 whose outside diameter corresponds exactly to the inside diameter of the cylindrical part 7 of the bore 5.

The bore 14 of sleeve 8 serves to receive an axially-displaceable closure needle 15, which has one end extending out of the sleeve 8 and carrying an arm 16. The diameter of the other end 17 of closure needle 15 is selected in such a way that the end of bore 14 in the sleeve 8 facing the outlet nozzle 4 can be closed with it the closure needle 15 and the bore 14 form a central jet between them. Between this closure part 17 of the closure needle 15 and the cylindrical guiding part of the closure needle 15 extends a conical surface 18. In the area of the conical surface 18, the sleeve 8 is equipped with a cylindrical recess 19, so that another annular space 20 is created between the inside wall of the sleeve 19 and the inside wall of the closure needle 15. Into this annular space 20 extends a radial channel 21 formed in the sleeve 8, which (as shown in FIG. 2) connects to a channel 22 within the injection head 1. On the opposite end of the channel 22 relative to the sleeve 8 is attached an injection cylinder 3. A channel 23 also extends from the injection cylinder 2 through the injection head 1 into the bore 5. The sleeve 8 has a heart-shaped channel 24 which merges into channel 23 in the position of the sleeve 8 shown in FIG. 2 of the injection head 1.

To the arm 9 of the sleeve 8 is connected a conventional piston-cylinder unit 25, through which it is possible to move the sleeve 5 from the position in FIG. 1 into the position shown in FIG. 2 and back. Also, the arm 16 of the closure needle 15 is connected to a piston-cylinder unit 26, which moves the closure needle 15 according to demand out of its closure position shown in FIG. 1 into the "open" position which is shown in FIG. 2.

During the fabrication of a molded body with several layers with a foamed core and a non-foamed thermoplastic outer skin, the sleeve 8 and the closure needle 15 are closed as shown in FIG. 1 of the drawing and a certain dose of plastic containing foaming media is introduced into the injection cylinder 3, while into the injection cylinder 2 is introduced a certain amount of dense plastic to form a smooth surface. As soon as the two injection cylinders 2, 3 are under tension, i.e., the cylinders are under working pressure, the piston-cylinder unit 25 will be pressurized in such a way that the sleeve moves out of its closed position into its open position as shown in FIG. 2. Through the arm 16 the closure needle 15 is displaced the same distance; however, the outlet opening of the sleeve 8 stays closed within the part 12. With the opening movement of the sleeve 8, the channel 24 (which is heart-shaped) comes into connected relationship with the channel 23 of injection head 1, so that, during displacement of the injection piston within the injection cylinder 2, the compact plastic to form the smooth outer skin flows through the channel 27 of the outlet nozzle 4 into the mold. As soon as the injection piston within injection cylinder 2 has passed a predetermined point and thereby a certain partial amount of plastic material forming the outer skin is present within the mold, then the piston-cylinder unit 26 is pressurized. This pressurizing can be done in such a way that the injection piston within injection cylinder 2 activates a cam. The closure needle 15 will now be displaced by the piston-cylinder unit 26 and the exit opening of the sleeve 8 is opened, as shown in FIG. 2. The plastic mass containing the foaming media, now can be pushed out of the injection cylinder 2 into the channel 27 of the nozzle 4 and then into the mold through the channel 22 within the injection head 1, through the channel 21 within sleeve 8, and through the circumferential space 20. With this operation, the emptying of the injection cylinder 2 will normally not be interrupted; only the amount of exit flow per unit time is reduced. Now the flow consists of one plastic string of ring-shaped cross-section made from dense material and a plastic string with circular cross-section containing the foaming media passing simultaneously through the channel 27 of the nozzle 4 into the mold. The speed of flow of these two plastic strings can be equal but also could be made different from each other by means of a corresponding control of the injection pistons within the injection cylinders 2, 3. The exit-flow speed (the amount of flow per unit time) of the expanding agent containing plastic out of the injection cylinder 3 is selected in such a way that the injection cylinder 3 is emptied before the injection cylinder 2. As soon as the injection piston of the injection cylinder 3 reaches the emptying position, the piston-cylinder unit will be pressurized in such a way that the exit-flow opening within the cylindrical part 12 of the sleeve 8 is closed by the closure needle 15. With this method of operation, any flow of plastic mass containing the foaming agent into the channel 27 of the outlet nozzle 4 is interrupted. The supply of non-foamed plastic from the injection cylinder 2, however, will continue for a short time, as long as it is certain that channel 27 of the nozzle 4 contains only non-foaming plastic coming from the injection cylinder 2. Now the piston cylinder unit 25 will be pressurized in such a way that the sleeve 8 moves again into its "closure" position as shown in FIG. 1. The closure needle 15 is moved by the piston cylinder unit 26 in the same way, so that the outlet opening within the cylindrical part 12 of sleeve 8 stays closed. Within the mold only the pressure of the air which escapes from the mold acts against the plastic containing the foaming agent, so that the foaming agent (which is well distributed within the plastic mass) can expend. There is an enlargement of the plasticized plastic mass and, consequently, this results in a complete filling of the mold. The molding mass present within the mold, that is to say, the injected molded body, consists now of a foamed core and an outer skin made from non-foaming plastic which surrounds the foamed core completely. After hardening of the molded mass, the molded body will be removed from the mold.

Figure 4:
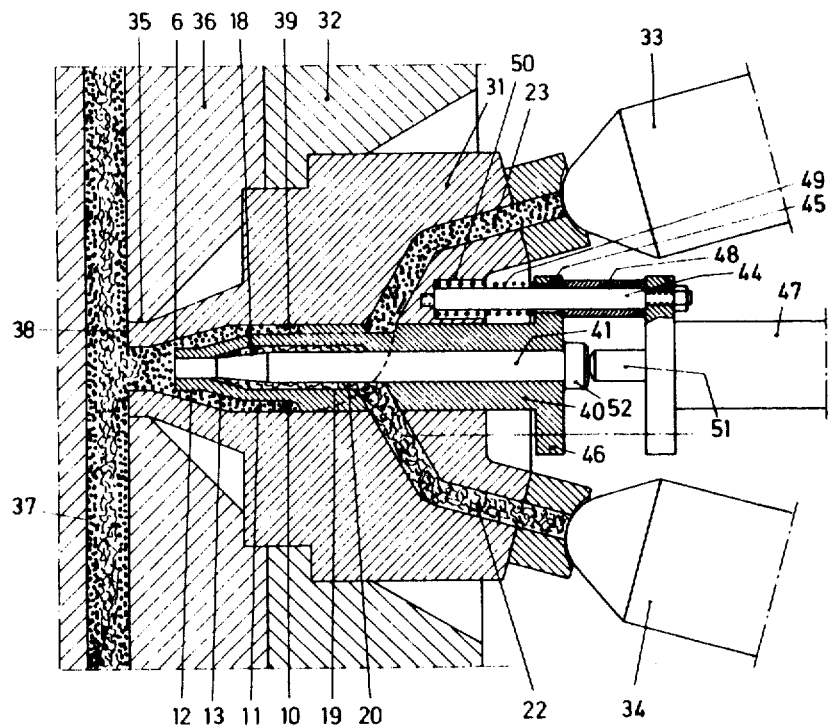
FIG. 4 shows the apparatus of FIG. 3 in another condition with a closed central jet and closed ring jet.
Figure 5:
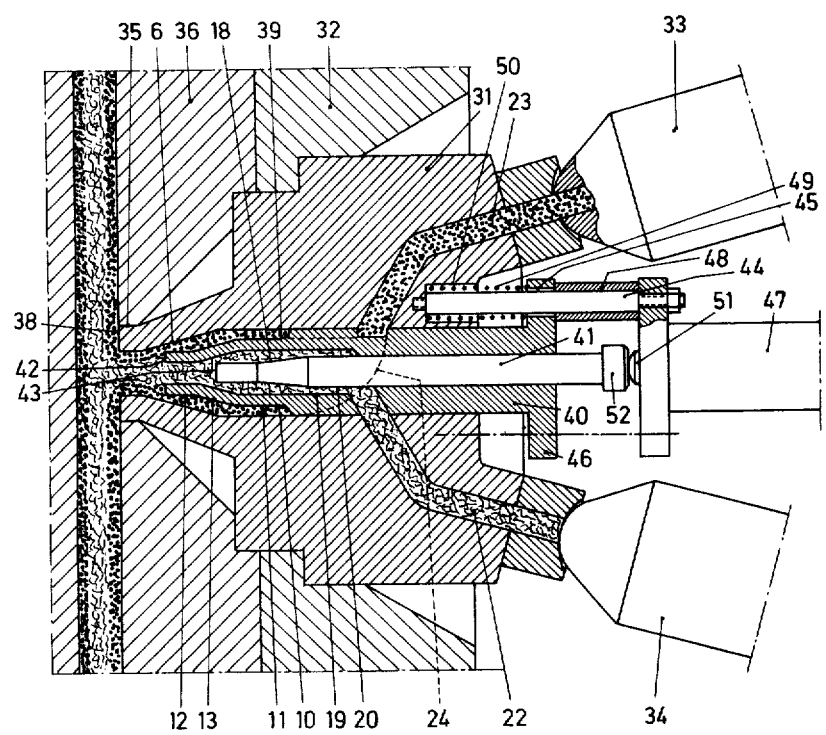
FIG. 5 shows the apparatus of FIGS. 3 and 4 with open central jet and open ring jet.

On the example of the invention shown in the FIGS. 3 to 5, the injection head 31, to which are attached two injection cylinders 33, 34 in the above-mentioned manner, will be supported by a plate-shaped injection head holder 32. At the same time the injection cylinder 33 contains a dense but non-foaming plastic mass, while the injection cylinder 34 contains the plastic mass containing the foaming agent. The injection head 31 extends through the injection head holder and is guided within a center opening 35 of the mold 36 which is equipped with a mold cavity 37. The free, annular-shaped front area 38 of the injection head 31 forms a part of the inside wall of the mold 36. Within the central bore 39 of the injection head 31 is also supported a sleeve 40 which is displaceable in the axial direction. It is shaped in the same manner as the sleeve 8 of FIGS. 1 and 2 and also contains a displaceable closure needle 41. In the closing position of the sleeve 40 and the closing needle 41 (see FIG. 3) the front area 42 of sleeve 40 and the front area 43 of the closure needle 41 are in the same plane as the front face 38 of the injection head 1. The front areas 42 and 43 also form a part of the inside wall of the mold.

On the opposite end of the injection head 31 from the mold 36 are screwed-in three guide rods 44 at 120° displacement, of which only one guide rod 44 is shown for clarity. These guide rods 44 extend through bore 45 formed in the collar 46 of the sleeve 40. On the free end of each guide rod 44 is screwed on a double-acting piston-cylinder unit 47. Between the collar 46 on the sleeve 40 and the piston-cylinder unit 47 and on the guide rods 44 are mounted spacer sleeves 48 against which the collar 46 is pressed by means of compression springs 49. These compression springs 49 also surround the guide rods 44 and are supported with recess 50 in the injection head 31. In the condition of piston-cylinder unit 47 shown in FIG. 5, the spacer pieces 48 determine the "open" position of sleeve 40. By corresponding pressure in the piston-cylinder unit 47, their piston 51 (on which the collar 52 of the closure needle 41 presses) is moved. The closure needle 41 extends into the sleeve far enough so that the collar 52 presses against the surface of the collar 46. With this operation, the first step of the piston-cylinder unit 47 movement is ended. In this position the ring jet is still open (limited by the injection head 31 and sleeve 40) and the central jet within sleeve 40 is closed by the closing needle 41 (FIG. 4). Now, as soon as the piston-cylinder unit 47 is put under further pressure, the piston 51 moves further in the direction of the injection head 31. This movement of the piston 51 causes a further displacement of the closure needle 41 through the collar 52 in the direction of the mold 36. Since the needle 41 with its collar 52 is pressing against the surface of the collar 46, the sleeve 40 will be thereby forcibly displaced against the force of the pressure springs 49, until the sleeve 40 and the closure needle 41 have taken the positions shown in FIG. 3.

During fabrication of a molded body with a foamed plastic core and a skin of dense plastic passing into the injection head 31, the openings and closure movements of the sleeve 40 and the closure needle 41 in the injection head 31 are made in the same manner as has been described in connection with the injection head 1 of FIG. 1. Considering that the front faces 38, 42 and 43 form a part of the inside wall of the mold 36, the finished molded body does not contain an outlet nozzle.

By use of the injection cylinder 1 (according to the FIGS. 1 and 2) it is possible to control the piston-cylinder unit 25, 26 in such a way that first only one non-foaming plastic and, thereafter, only plastic containing foaming agent can be injected into the mold. Furthermore, it is possible to exchange the filling of both injection cylinders 2, 3, or 33, 34.

It is obvious that minor changes may be made in the form and construction of the invention without departing from the material spirit thereof. It is not, however, desired to confine the invention to the exact form herein shown and described, but it is desired to include all such as properly come within the scope claimed.

I claim:

1. Injection molding apparatus for the injection molding of bodies consisting of several layers, including a foamed thermoplastic core and a non-foamed thermoplastic skin, by injecting foaming and non-foaming thermoplastic material into a hollow molding tool, comprising:
   a. an injection head having an axial first bore,
   b. a first injection cylinder adapted to deliver a foaming thermoplastic material,
   c. a second injection cylinder adapted to deliver foaming thermoplastic material,
   d. a ring jet closing sleeve axially movable within the first bore and having a second axial bore,
   e. a closure needle axially movable within the second bore, f. a ring jet formed by the injection head and the closing sleeve, g. a central jet formed by the closing sleeve and the closure needle, h. a first conduit adapted to carry material from one of the cylinders to the ring jet, and i. a second conduit adapted to carry material from the other of the cylinders to the central jet.

2. Apparatus as recited in claim 1, wherein the said one of the cylinders is the first cylinder and the said other of the cylinders is the second cylinder.

3. Apparatus as recited in claim 1, wherein the sleeve and closure needle have front areas (42, 43) and the injection head has a front face (38) each at their respective forwardmost extremities, and when the sleeve, needle, and head are in a position in which the ring jet and central jet are closed, the face and areas are coplanar.

4. Apparatus as rectied in claim 3, wherein the front face and front areas form a part of the inside wall of the molding tool.

5. Apparatus as recited in claim 1, wherein separate displacement drives (25, 26) are connected to the sleeve and to the closure needle.

6. Apparatus as recited in claim 5, wherein the displacement drives control the positions of the sleeve, needle, and injection head with respect to one another.

* * * * *